(12) United States Patent
Sobel

(10) Patent No.: US 9,378,373 B2
(45) Date of Patent: Jun. 28, 2016

(54) SOFTWARE PUBLISHER TRUST EXTENSION APPLICATION

(75) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 2139 days.

(21) Appl. No.: 11/860,060

(22) Filed: Sep. 24, 2007

(65) Prior Publication Data

US 2009/0083731 A1 Mar. 26, 2009

(51) Int. Cl.
G06F 9/445 (2006.01)
G06F 21/57 (2013.01)
G06F 21/51 (2013.01)

(52) U.S. Cl.
CPC .............. *G06F 21/577* (2013.01); *G06F 21/51* (2013.01)

(58) Field of Classification Search
None
See application file for complete search history.

(56) References Cited

U.S. PATENT DOCUMENTS

| | | | |
|---|---|---|---|
| 5,892,904 A * | 4/1999 | Atkinson et al. | 726/22 |
| 6,367,012 B1 | 4/2002 | Atkinson et al. | |
| 7,730,040 B2 * | 6/2010 | Reasor et al. | 707/690 |
| 7,765,481 B2 * | 7/2010 | Dixon et al. | 715/738 |
| 7,831,915 B2 * | 11/2010 | Averbuch et al. | 715/738 |
| 2004/0250086 A1 | 12/2004 | Maucher | |
| 2006/0253579 A1 * | 11/2006 | Dixon et al. | 709/225 |
| 2006/0253584 A1 * | 11/2006 | Dixon et al. | 709/225 |
| 2007/0107054 A1 * | 5/2007 | Averbuch et al. | 726/22 |
| 2007/0118802 A1 * | 5/2007 | Gerace et al. | 715/738 |
| 2007/0208940 A1 * | 9/2007 | Adelman et al. | 713/168 |

FOREIGN PATENT DOCUMENTS

WO WO-2006101758 A2 9/2006

OTHER PUBLICATIONS

Microsoft Corporation; "Digital Code Signing Step-by-Step Guide" by Siew-Moi Khor, Published Mar. 2002, pp. 1-20 [online] [retrieved on Oct. 19, 2011]. Retrieved from <http://msdn.microsoft.com/en-us/library/aa140234(v=office.10).aspx>.*
Boldt et al., "Preventing Privacy-Invasive Software Using Collaborative Reputation Systems", *Secure Data Management; Lecture Notes in Computer Science*, Sep. 6, 2007, pp. 142-157, vol. 4721, Springer-Verlag Berlin Heidelberg.
Kennedy, U.S. Appl. No. 11/496,852, filed Jul. 31, 2006, entitled "Installer Trust Chain Validation".
"Windows Installer 2.0 Redistributable for Windows 95, 98, and Me", pp. 1-3 [online]. Retrieved on Nov. 3, 2006. Retrieved from the Internet:<URL:http://www.microsoft.com/downloads/details.aspx?FamilyID=cebbacd8-c094-4255-b702-de3bb768148f&DisplayLang=en>, Author unknown.
David Youd, "What is a Digital Signature?", pp. 1-4 [online]. Retrieved on Jul. 21, 2006. Retrieved from the Internet: <URL:http://www.youdzone.com/signature.html>.
Office Action issued by the Japanese Patent Office for Japanese Patent Application No. 2008-233245 dated Mar. 17, 2015 (7 pgs.).

* cited by examiner

*Primary Examiner* — Evral E Bodden
(74) *Attorney, Agent, or Firm* — Wilmer Cutler Pickering Hale and Dorr LLP

(57) ABSTRACT

A digitally signed unknown application from a software publisher having a reputation is assigned the reputation of the software publisher. In this manner, software publishers who have an established reputation of publishing applications are allowed to rely on their existing reputation when releasing a new application. By quickly assigning reputations to new applications, users executing the new applications for the first time are provided timely recommendations on the quality, e.g., trustworthiness, of the applications they wish to run.

16 Claims, 3 Drawing Sheets

SOFTWARE PUBLISHER TRUST EXTENSION APPLICATION

BACKGROUND

1. Field of the Invention

The present invention relates to computer system security. More particularly, the present invention relates to a system and method of establishing trust of an application of a computer system.

2. Description of the Related Art

A behavior blocking system heuristically monitors applications and blocks suspicious behavior that the behavior blocking system considers as malicious based on the trust level of the application. Accordingly, assessing the trust level of an application is very important in behavior blocking.

SUMMARY OF THE INVENTION

In accordance with one embodiment, a digitally signed unknown application from a software publisher having a reputation is assigned the reputation of the software publisher. In this manner, software publishers who have an established reputation of publishing applications are allowed to rely on their existing reputation when releasing a new application. By quickly assigning reputations to new applications, users executing the new applications for the first time are provided timely recommendations on the quality, e.g., trustworthiness, of the applications they wish to run.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
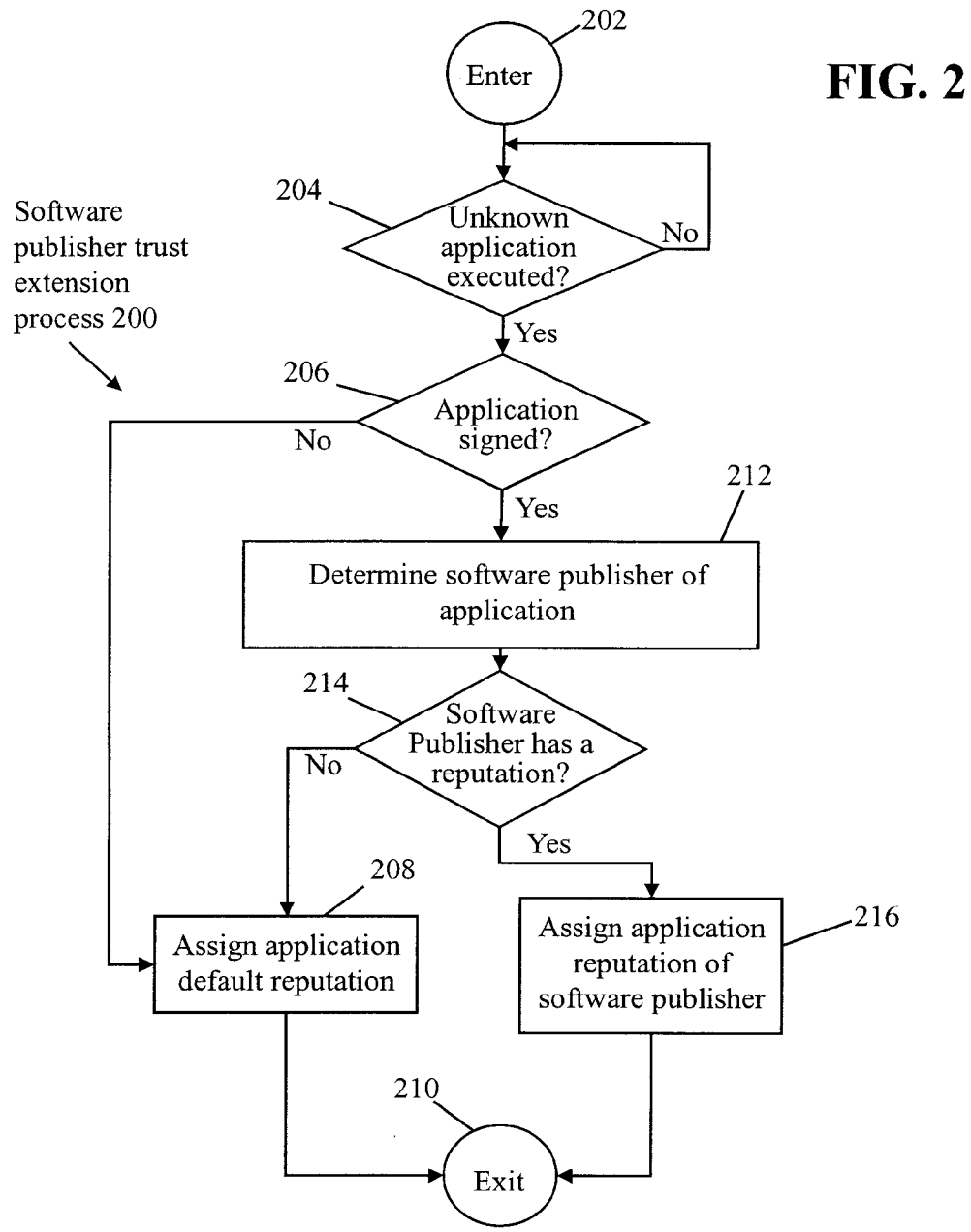
FIG. 2 is a flow diagram of a software publisher trust extension process in accordance with one embodiment.

Referring to FIG. 2, a digitally signed unknown application from a software publisher having a reputation is assigned the reputation of the software publisher in an ASSIGN APPLICATION REPUTATION OF SOFTWARE PUBLISHER OPERATION 216. In this manner, software publishers who have an established reputation of publishing applications are allowed to rely on their existing reputation when releasing a new application. By quickly assigning reputations to new applications, users executing the new applications for the first time are provided timely recommendations on the quality, e.g., trustworthiness, of the applications they wish to run.

Figure 1:
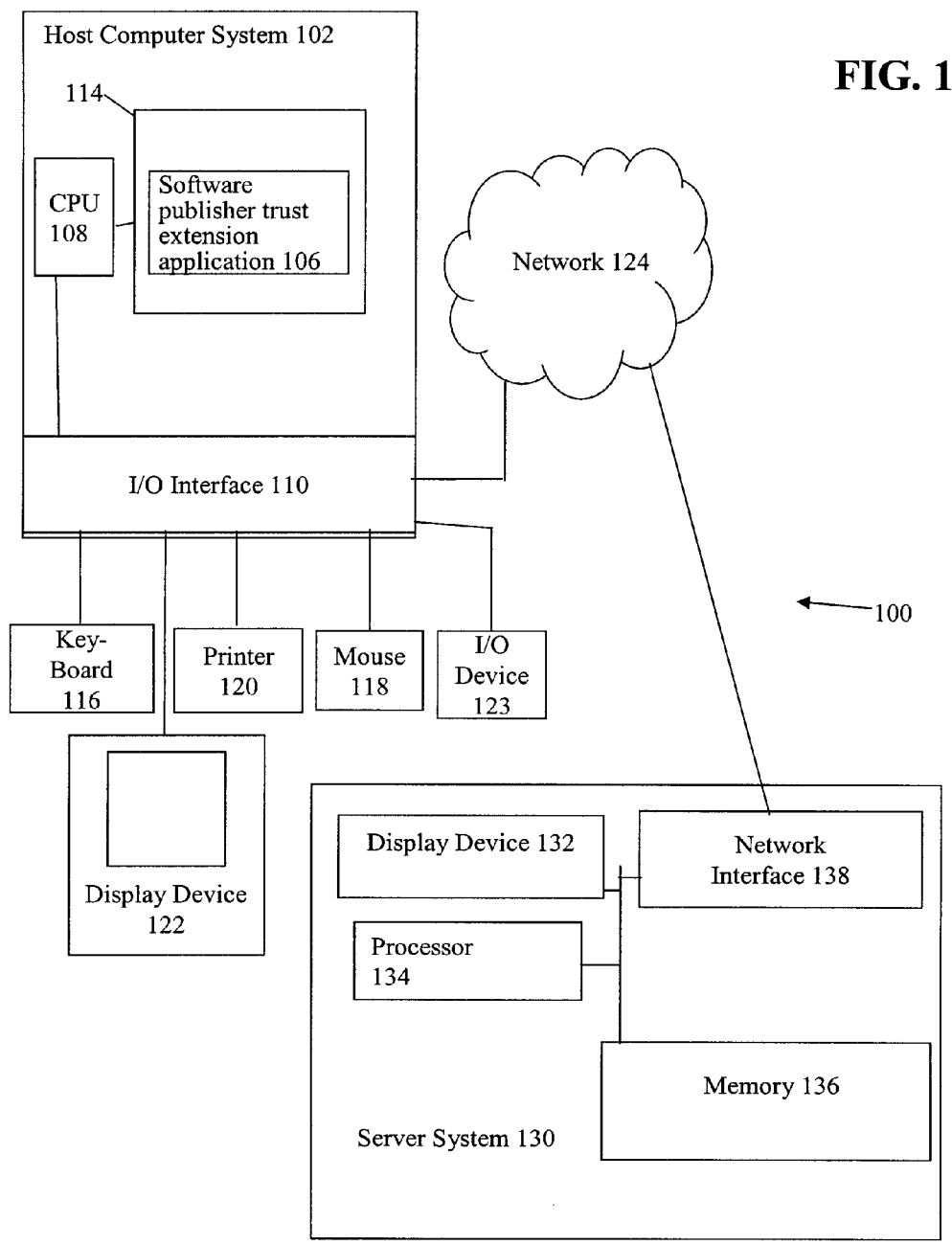
FIG. 1 is a diagram of a client-server system that includes a software publisher trust extension application executing on a host computer system in accordance with one embodiment.

More particularly, FIG. 1 is a diagram of a client-server system 100 that includes a software publisher trust extension application 106 executing on a host computer system 102 in accordance with one embodiment.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, software publisher trust extension application 106 is loaded into host computer system 102 via I/O device 123, such as from a CD, DVD, or floppy disk containing software publisher trust extension application 106.

Host computer system 102 is coupled to a server system 130 of computer system 100 by a network 124. Server system 130 typically includes a display device 132, a processor 134, a memory 136, and a network interface 138.

Network 124 can be any network or network system that is of interest to a user. In various embodiments, network interface 138 and I/O interface 110 include analog modems, digital modems, or a network interface card.

Software publisher trust extension application 106 is stored, for example, in memory 114 of host computer system 102 and executed on host computer system 102.

The particular type of and configuration of host computer system 102 and server system 130 are not essential to this embodiment.

Herein, in one embodiment, malicious code is defined as any computer program, module, set of modules, or code that enters a computer system environment without an authorized user's knowledge and/or without an authorized user's consent.

FIG. 2 is a flow diagram of a software publisher trust extension process 200 in accordance with one embodiment. Referring now to FIGS. 1 and 2 together, in one embodiment, execution of software publisher trust extension application 106 by processor 108 results in the operations of software publisher trust extension process 200 as described below.

From an ENTER OPERATION 202, flow moves to an UNKNOWN APPLICATION EXECUTED CHECK OPERATION 204. In UNKNOWN APPLICATION EXECUTED CHECK OPERATION 204, a determination is made as to whether an unknown application is being executed.

In one embodiment, an application is a program or group of programs designed for end-users. More particularly, applications (also called end-user programs) include database programs, word processors, and spreadsheets, although there are many different types of applications.

In one embodiment, an application is an executable file. An executable file is a file who's contents are meant to be interpreted as a program by a computer. In one example, an executable file has a .exe extension (an EXE file) but has other extensions such as .net in other embodiments. The determination about whether an application has been executed can be made using any one of a number of techniques well known to those of skill in the art, and the particular technique used is not essential to this embodiment.

As used herein, an application is either a known application or an unknown application. A known application is an application that has an assigned reputation. A reputation is the overall trustworthiness of the application as determined by a security vendor or security product. A reputation is measured by a reputation score in one embodiment.

To illustrate, if an application is found to install spyware, viruses, Trojan horses, or other malicious code, the application is determined to be untrustworthy, i.e., the trustworthiness of the application is that the application is untrustworthy. Conversely, if an application is found to be safe, the application is determined to be trustworthy, i.e., the trustworthiness of the application is that the application is trustworthy. Although two examples of trustworthiness are provided, trustworthiness can be defined with a great degree of granularity such that there are many levels of trustworthiness.

Further, regardless of the application's trustworthiness, the fact that an application has been evaluated to determine the application's trustworthiness means that the application has been assigned a reputation and thus is a known application in accordance with this embodiment. Conversely, an application that has not been evaluated to determine the application's trustworthiness is an unknown application in accordance with this embodiment.

If a determination is made that an unknown application has not been executed, flow remains at UNKNOWN APPLICATION EXECUTED CHECK OPERATION 204. Conversely, upon a determination that an unknown application is being executed, flow moves from UNKNOWN APPLICATION EXECUTED CHECK OPERATION 204 to an APPLICATION SIGNED CHECK OPERATION 206.

In APPLICATION SIGNED CHECK OPERATION 206, a determination is made as to whether the unknown application is signed, i.e., as to whether the unknown application has a valid digital signature. An application that has a valid digital signature is sometimes called a digitally signed application.

A digital signature is digital code that is attached to an application. Digital signatures are well known to those of skill in the art and generally serve to authenticate and validate an application. In one embodiment, authentication ensures that the application is in fact from the purported software publisher. Validation ensures that the application has not been modified, e.g., during transit.

In one embodiment, a digital signature is created using mathematical formulas that encrypt a hash of the application with a private key. A recipient of the digitally signed application uses the public key corresponding to the private key to authenticate and validate the application.

As is also well known to those of skill in the art, the public key is published using a digital certificate. Stated another way, a digital certificate is a package that includes the public key. To insure that the digital certificate and thus public key are authentic and valid, digital certificates are often digitally signed by a trusted third party, e.g., a certificate authority center.

In accordance with one embodiment, an application has a valid digital signature if the associated digit certificate is valid and issued from a reputable certificate authority center, and the file is authenticated and validated using the digital signature.

If a determination is made that the application is not signed, flow moves from APPLICATION SIGNED CHECK OPERATION 206 to an ASSIGN APPLICATION DEFAULT REPUTATION OPERATION 208. In ASSIGN APPLICATION DEFAULT REPUTATION OPERATION 208, the unknown application is assigned the default reputation for an unknown application. Illustratively, the default reputation is that the unknown application is untrustworthy although other default reputations are assigned in other embodiments. From ASSIGN APPLICATION DEFAULT REPUTATION OPERATION 208, flow moves to and exits at an EXIT OPERATION 210 or returns to UNKNOWN APPLICATION EXECUTED CHECK OPERATION 204 and awaits the execution of the next unknown application.

Returning again to APPLICATION SIGNED CHECK OPERATION 206, upon a determination that the application is signed, flow moves from APPLICATION SIGNED CHECK OPERATION 206 to a DETERMINE SOFTWARE PUBLISHER OF APPLICATION OPERATION 212. In DETERMINE SOFTWARE PUBLISHER OF APPLICATION OPERATION 212, the software publisher of the unknown application is determined. In one embodiment, the software publisher is the entity, e.g., company, that published the unknown application. Stated another way, the software publisher is the entity that produced or released the unknown application for distribution to the end-users.

In one embodiment, the software publisher is determined from the digital signature of the unknown application. As set forth above, the digital signature is used to insure that the application is in fact from the purported software publisher. Accordingly, the digital signature allows the software publisher of the unknown application to be determined as those of skill in the art will understand.

From DETERMINE SOFTWARE PUBLISHER OF APPLICATION OPERATION 212, flow moves to a SOFTWARE PUBLISHER HAS A REPUTATION CHECK OPERATION 214. In SOFTWARE PUBLISHER HAS A REPUTATION CHECK OPERATION 214, a determination is made as to whether the software publisher of the unknown application has a reputation. In one embodiment, software publisher information about the software publisher, e.g., the name or other identifier of the software publisher, is queried against a reputation system having software publisher information and associated software publisher reputations to determine if the software publisher has a reputation.

In one embodiment, regardless of the trustworthiness of the software publisher, the fact that the software publisher has been evaluated, e.g., by a security company or security product, to determine the trustworthiness of the software publisher means that the software publisher has a reputation. Conversely, if the software publisher has not been evaluated to determine the trustworthiness of the software publisher, the software publisher does not have a reputation.

In one embodiment, applications of the software publisher are evaluated to determine the reputation, e.g., trustworthiness, of the applications. The reputations of the applications of the software publisher are collectively aggregated to form the reputation of the software publisher.

To illustrate, assume that a first software publisher has published several signed applications that have been evaluated and determined to be trustworthy, e.g., have a good reputation. In accordance with this example, the first software publisher will have a good reputation, e.g., be determined to be trustworthy.

In another example, assume that a second software publisher has published several signed applications that have been evaluated and determined to be untrustworthy, e.g., have a bad reputation. In accordance with this example, the second software publisher will have a bad reputation, e.g., be determined to be untrustworthy.

In yet another example, assume that a third software publisher has published several signed applications that have been evaluated. All but one of the applications by the third software publisher are determine to be trustworthy, and the one application is determined to be untrustworthy. In accordance with this example, the third software publisher will have a poor reputation, e.g., a reputation less than the good reputation of the first software publisher yet greater than the bad reputation of the second software publisher. This example illustrates that trust is hard to earn and easy to lose. In all three examples, the software publishers have a reputation.

In another embodiment, the users of applications of the software publisher are evaluated to determine the reputation, e.g., trustworthiness, of the software publisher. The reputations of the users of applications of the software publisher are collectively aggregated to form the reputation of the software publisher. Illustratively, a determination is made as to whether the users of applications of the software publisher normally do not have malicious code present on their computer systems and vice versa.

To illustrate, assume that a first group of users does not normally have malicious code on their computer systems. Accordingly, this first group of users have a good reputation, i.e., are trustworthy. Further, this first group of users run applications by a first software publisher. In accordance with this example, the first software publisher will have a good reputation, e.g., be determined to be trustworthy, based on the determination that the users of applications of the software publisher are trustworthy.

In another example, a second group of users does normally have malicious code on their computer systems. Accordingly, this second group of users have a bad reputation, i.e., are untrustworthy. Further, this second group of users run applications by a second software publisher. In accordance with this example, the second software publisher will have a bad reputation, e.g., be determined to be untrustworthy, based on the determination that the users of applications of the software publisher are untrustworthy.

In yet another example, ninety percent of a third group of users does not normally have malicious code on their computer systems while the remaining ten percent does normally have malicious code on their computer systems. Accordingly, this third group of users have a poor reputation, e.g., a reputation less than the good reputation of the first group of users yet greater than the bad reputation of the second group of users. Further, this third group of users run applications by a third software publisher. In accordance with this example, the third software publisher will have a poor reputation, e.g., a reputation less than the good reputation of the first software publisher yet greater than the bad reputation of the second software publisher, based on the reputation of the third group of users. Again, this example illustrates that trust is hard to earn and easy to lose. Again, in all three examples, the software publishers have a reputation.

Although some examples are provided herein, in light of this disclosure, those of skill in the art will understand that the reputation of the software publisher can be defined by multiple criteria. The reputation of the software publisher can be established using any one of a number of techniques, and the particular technique used to establish the reputation is not essential to this embodiment.

If the software publisher of the unknown application does not have a reputation, flow moves from SOFTWARE PUBLISHER HAS A REPUTATION CHECK OPERATION 214 to ASSIGN APPLICATION DEFAULT REPUTATION OPERATION 208, which is performed as discussed above.

Conversely, if the software publisher does have a reputation, flow moves from SOFTWARE PUBLISHER HAS A REPUTATION CHECK OPERATION 214 to an ASSIGN APPLICATION REPUTATION OF SOFTWARE PUBLISHER OPERATION 216.

In ASSIGN APPLICATION REPUTATION OF SOFTWARE PUBLISHER OPERATION 216, the unknown application is assigned the reputation of the software publisher, i.e., is assigned the trustworthiness of the software publisher as determined by a security company or security product.

In this manner, a digitally signed unknown application from a software publisher having a reputation is assigned the reputation of the software publisher. This allows software publishers who have an established reputation of publishing applications to rely on their existing reputation when releasing a new application. More particularly, by extending the trust of the software publisher to the new application, suspicious behavior of the new application, as well as execution of the new application in the first place, is allowed or blocked depending upon the reputation of the software publisher as discussed below in greater detail with reference to FIG. 3.

Figure 3:
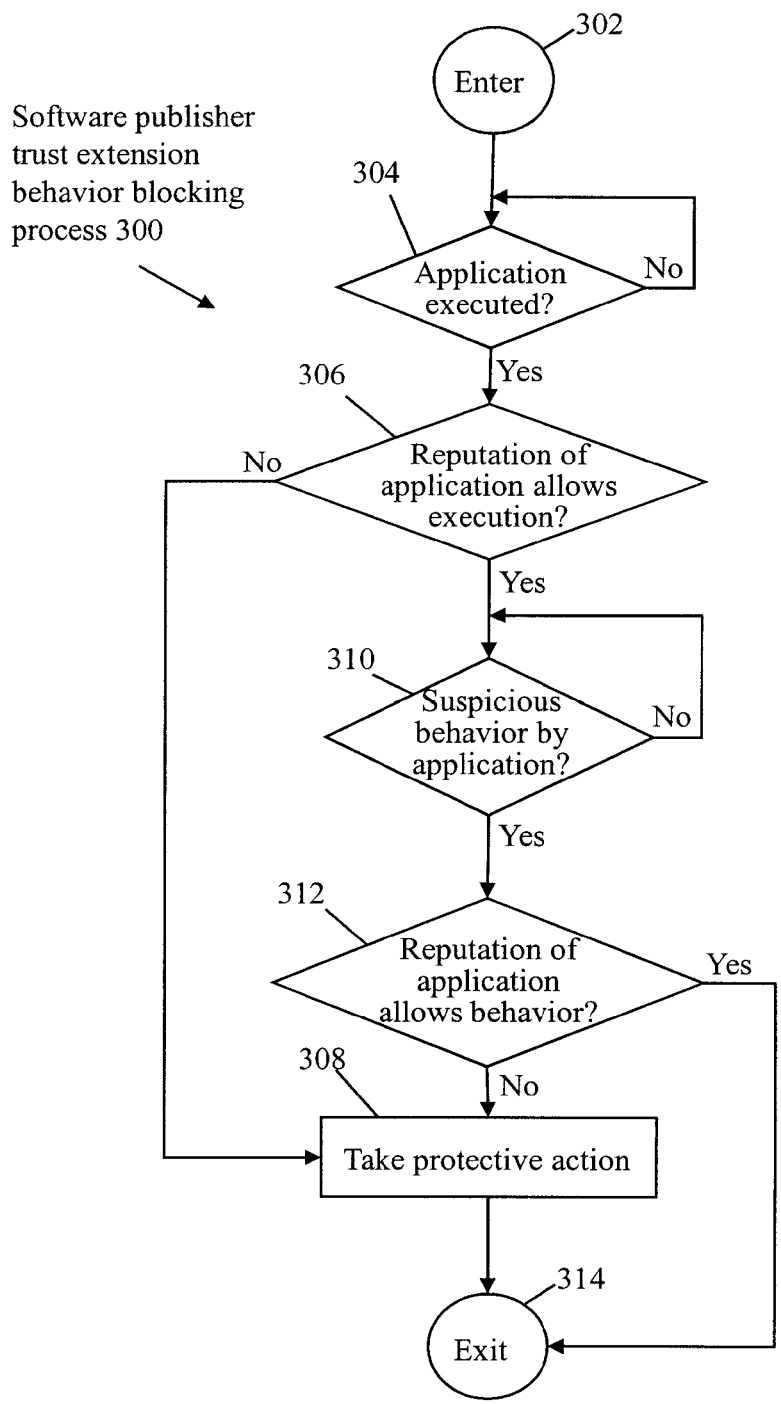
FIG. 3 is a flow diagram of a software publisher trust extension behavior blocking process in accordance with one embodiment.

FIG. 3 is a flow diagram of a software publisher trust extension behavior blocking process 300 in accordance with one embodiment. Referring now to FIGS. 1 and 3 together, in one embodiment, execution of software publisher trust extension application 106 and/or a comprehensive security application of host computer system 102 by processor 108 results in the operations of software publisher trust extension behavior blocking process 300 as described below.

From an ENTER OPERATION 302, flow moves to an APPLICATION EXECUTED CHECK OPERATION 304. In APPLICATION EXECUTED CHECK OPERATION 304, a determination is made as to whether an application is being executed.

If a determination is made that an application has not been executed, flow remains at APPLICATION EXECUTED CHECK OPERATION 304. Conversely, upon a determination that an application is being executed, flow moves from APPLICATION EXECUTED CHECK OPERATION 304 to a REPUTATION OF APPLICATION ALLOWS EXECUTION CHECK OPERATION 306.

In REPUTATION OF APPLICATION ALLOWS EXECUTION CHECK OPERATION 306, a determination is made as to whether the reputation of the application allows the application's execution. In one embodiment, the reputation of the application is assigned to the application in ASSIGN APPLICATION REPUTATION OF SOFTWARE PUBLISHER OPERATION 216 (FIG. 2).

If the reputation of the application does not allow execution of the application, flow moves from REPUTATION OF APPLICATION ALLOWS EXECUTION CHECK OPERATION 306 to a TAKE PROTECTIVE ACTION OPERATION 308. In TAKE PROTECTIVE ACTION OPERATION 308, protective action is taken. In accordance with this embodiment, as the reputation of the application does not allow the application to be executed, the application is prevented from being executed although other protective action is taken in other embodiments.

In one embodiment, in TAKE PROTECTIVE ACTION OPERATION 308, the user wishing to execute (run) the application is provided a notification, e.g., with a pop-up window, that the application is untrustworthy, e.g., has a bad reputation, and is advised not to execute the application. In accordance with this example, user approval is received for allowing or preventing execution of the application.

From TAKE PROTECTIVE ACTION OPERATION 308, flow moves to and exits at an EXIT OPERATION 314 or returns to APPLICATION EXECUTED CHECK OPERATION 304 and awaits the execution of the next application.

Conversely, returning to REPUTATION OF APPLICATION ALLOWS EXECUTION CHECK OPERATION 306, if a determination is made that the reputation of the application allows the application's execution, flow moves from REPUTATION OF APPLICATION ALLOWS EXECUTION CHECK OPERATION 306 to a SUSPICIOUS BEHAVIOR BY APPLICATION CHECK OPERATION 310.

In SUSPICIOUS BEHAVIOR BY APPLICATION CHECK OPERATION 310, a determination is made as to whether the application is exhibiting suspicious behavior, i.e., whether behavior by the application is suspicious. In one embodiment, suspicious behavior is behavior that is indicative of malicious code, e.g., malicious behavior, but may also be legitimate behavior.

If a determination is made that the application is not exhibiting suspicious behavior, flow remains at SUSPICIOUS BEHAVIOR BY APPLICATION CHECK OPERATION 310. Conversely, upon a determination that the application is exhibiting suspicious behavior, flow moves from SUSPICIOUS BEHAVIOR BY APPLICATION CHECK OPERATION 310 to a REPUTATION OF APPLICATION ALLOWS BEHAVIOR CHECK OPERATION 312.

In REPUTATION OF APPLICATION ALLOWS BEHAVIOR CHECK OPERATION 312, a determination is made as to whether the reputation of the application allows the suspicious behavior. As set forth above, in one embodiment, the reputation of the application was assigned to the application in ASSIGN APPLICATION REPUTATION OF SOFTWARE PUBLISHER OPERATION 216 (FIG. 2).

If the reputation of the application does not allow the suspicious behavior, flow moves from REPUTATION OF APPLICATION ALLOWS BEHAVIOR CHECK OPERATION 312 to TAKE PROTECTIVE ACTION OPERATION 308. In accordance with this embodiment, as the reputation of the application does not allow the suspicious behavior, the suspicious behavior is blocked although other protective action is taken in other embodiments.

Conversely, if the reputation of the application does allow the suspicious behavior, flow moves from REPUTATION OF APPLICATION ALLOWS BEHAVIOR CHECK OPERATION 312 and exits at EXIT OPERATION 314 or returns to SUSPICIOUS BEHAVIOR BY APPLICATION CHECK OPERATION 310 and awaits the next suspicious behavior by the application.

The following is an illustrative example. Take the case where a small software publisher company is named "GOOD REPUTATION COMPANY". GOOD REPUTATION COMPANY has been in business for several years, e.g., since 2001, and over the last six years has published about 20 applications, e.g., shareware titles. All of these 20 applications are digitally signed by GOOD REPUTATION COMPANY and have a good reputation, e.g., have been determined to be trustworthy by a security company or security product.

GOOD REPUTATION COMPANY publishes a new application that is digitally signed but does not have a reputation. Accordingly, referring to FIG. 2, upon execution of the new application, a determination is made that an unknown application is being executed in UNKNOWN APPLICATION EXECUTED CHECK OPERATION 204 and flow moves to APPLICATION SIGNED CHECK OPERATION 206.

In APPLICATION SIGNED CHECK OPERATION 206, a determination is made that the new application is signed and flow moves to DETERMINE SOFTWARE PUBLISHER OF APPLICATION OPERATION 212. In DETERMINE SOFTWARE PUBLISHER OF APPLICATION OPERATION 212, a determination is made that GOOD REPUTATION COMPANY is the software publisher of the new application.

In SOFTWARE PUBLISHER HAS A REPUTATION CHECK OPERATION 214, a determination is made that GOOD REPUTATION COMPANY does have a reputation. In accordance with this example, the reputation is a good reputation, i.e., that the software publisher is trustworthy. Accordingly, in ASSIGN APPLICATION REPUTATION OF SOFTWARE PUBLISHER OPERATION 216, the new application is assigned the good reputation of the software publisher.

Accordingly, referring now to FIG. 3, upon execution of the new application, a determination is made that the good reputation of the new application allows execution of the new application in REPUTATION OF APPLICATION ALLOWS EXECUTION CHECK OPERATION 306.

Further, in the event that the new application exhibits suspicious behavior, a determination is made that the reputation of the new application allows the suspicious behavior in REPUTATION OF APPLICATION ALLOWS BEHAVIOR CHECK OPERATION 312 depending upon the particular suspicious behavior and assigned reputation of new application.

In a second example, take the case where a small software publisher company is named "BAD REPUTATION COMPANY". BAD REPUTATION COMPANY has also been in business for several years and over the last six years has published about 20 applications, e.g., shareware titles. All of these 20 applications are digitally signed by BAD REPUTATION COMPANY and have a bad reputation, e.g., have been determined to be untrustworthy, e.g., contain malicious code, by a security company or security product.

BAD REPUTATION COMPANY publishes a new application that is digitally signed but does not have a reputation. Accordingly, referring to FIG. 2, upon execution of the new application, a determination is made that an unknown application is being executed in UNKNOWN APPLICATION EXECUTED CHECK OPERATION 204 and flow moves to APPLICATION SIGNED CHECK OPERATION 206.

In APPLICATION SIGNED CHECK OPERATION 206, a determination is made that the new application is signed and flow moves to DETERMINE SOFTWARE PUBLISHER OF APPLICATION OPERATION 212. In DETERMINE SOFTWARE PUBLISHER OF APPLICATION OPERATION 212, a determination is made that BAD REPUTATION COMPANY is the software publisher of the new application.

In SOFTWARE PUBLISHER HAS A REPUTATION CHECK OPERATION 214, a determination is made that BAD REPUTATION COMPANY does have a reputation. In accordance with this example, the reputation is a bad reputation, i.e., that the software publisher is untrustworthy. Accordingly, in ASSIGN APPLICATION REPUTATION OF SOFTWARE PUBLISHER OPERATION 216, the new application is assigned the bad reputation of the software publisher.

Accordingly, referring now to FIG. 3, upon execution of the new application, a determination is made that the bad reputation of the new application does not allow execution of the new application in REPUTATION OF APPLICATION ALLOWS EXECUTION CHECK OPERATION 306. Thus, the execution of the application is prevented in TAKE PROTECTIVE ACTION OPERATION 308, although other protective action is taken in other embodiments.

In the above manner, by knowing the reputation of the software publisher, new signed applications by the same software publisher are quickly assigned a reputation. In this manner, users executing the unknown applications are provided timely recommendations on the quality, e.g., trustworthiness, of the applications they wish to run.

Referring again to FIG. 1, although software publisher trust extension application 106 is referred to as an application, this is illustrative only. Software publisher trust extension application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a non-transitory tangible medium configured to store computer readable code including CD-ROM discs, DVDs, ROM cards, floppy discs, magnetic tapes, computer hard drives and servers on a network.

As illustrated in FIG. 1, this medium belongs to the computer system itself. However, the medium is also removed from the computer system. For example, software publisher trust extension application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute software publisher trust extension application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, software publisher trust extension application 106 in accordance with one embodiment can be implemented in a wide variety of computer system configurations. In addition, software publisher trust extension application 106 could be stored as different modules in memories of different devices. For example, software publisher trust extension application 106 could initially be stored in server system 130, and as necessary, a portion of software publisher trust extension application 106 could be transferred to host computer system 102 and executed on host computer system 102. Consequently, part of the software publisher trust extension functionality would be executed on processor 134 of server system 130, and another part would be executed on processor 108 of host computer system 102. In view of this disclosure, those of skill in the art can implement various embodiments in a wide variety of physical hardware configurations using an operating system and computer programming language of interest to the user.

In yet another embodiment, software publisher trust extension application 106 is stored in memory 136 of server system 130. Software publisher trust extension application 106 is transferred over network 124 to memory 114 in host computer system 102. In this embodiment, network interface 138 and I/O interface 110 would include analog modems, digital modems, or a network interface card. If modems are used, network 124 includes a communications network, and software publisher trust extension application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
executing, on a processor of a host computer system, a software publisher trust extension application, the executing including:
determining a software publisher of an unknown application, wherein the unknown application is an application without an assigned reputation;
determining reputations of respective ones of at least one user of software published by the software publisher, wherein individual respective reputations of ones of the at least one user being either a first reputation of normally having malicious software on a computing system of the user or a second reputation of not normally having malicious software on a computing system of the user;
determining whether the software publisher of the unknown application has a reputation, the reputation of the software publisher at least including aggregated user reputations of users of software published by the software publisher including the previously determined reputations of the at least one user of software published by the software publisher; and
assigning said reputation of the software publisher to said unknown application upon a determination that said software publisher does have the reputation,
wherein the reputation of the software publisher includes a number of applications published by the software publisher and a number of the published applications including malware, and
the assigning of the reputation changes the unknown application to a known application.

2. The computer-implemented method of claim 1 wherein said reputation is an overall trustworthiness of said software publisher.

3. The computer-implemented method of claim 1 wherein said software publisher published said application by producing or releasing said application for distribution to end-users.

4. The computer-implemented method of claim 3 wherein said application comprises a program designed for said end-users.

5. The computer-implemented method of claim 1 further comprising:
determining, prior to the determining a software publisher, whether said unknown application is digitally signed.

6. The computer-implemented method of claim 5 further comprising:
assigning a default reputation to said unknown application following a determination that said unknown application is not digitally signed.

7. The computer-implemented method of claim 5 wherein said determining whether said unknown application is digitally signed comprises determining whether said unknown application has a valid digital signature.

8. The computer-implemented method of claim 7 wherein the determining said software publisher of said application comprises:
   determining said software publisher of said application from said valid digital signature following a determination that said unknown application is digitally signed.

9. The computer-implemented method of claim 1 further comprising:
   assigning a default reputation to said application following a determination that said software publisher does not have a reputation.

10. The computer-implemented method of claim 1 further comprising determining whether said known application is being executed, wherein upon a determination that said known application is being executed, said computer-implemented method further comprising determining whether said reputation of said known application allows said execution.

11. The computer-implemented method of claim 10 wherein upon a determination that said reputation of said known application does not allow said execution, said computer-implemented method further comprising taking protective action.

12. The computer-implemented method of claim 11 wherein said taking protective action comprises preventing said execution of said known application.

13. The computer-implemented method of claim 1, wherein said reputation further includes information about application behavior, the computer-implemented method further comprising:
   determining whether said known application is being executed;
   determining whether said executing known application is exhibiting suspicious behavior following a determination that said known application is being executed; and
   determining whether said reputation of said known application allows said suspicious behavior following a determination that said executing known application is exhibiting suspicious behavior.

14. The computer-implemented method of claim 13 wherein upon a determination that said reputation of said known application does not allow said suspicious behavior, said computer-implemented method further comprising taking protective action.

15. A computer system comprising:
   a memory having stored therein a software publisher trust extension application; and
   a processor coupled to said memory, wherein execution of said software publisher trust extension application performs a method comprising:
      determining a software publisher of an unknown application, wherein the unknown application is an application without an assigned reputation;
      determining reputations of respective ones of at least one user of software published by the software publisher, wherein individual respective reputations of ones of the at least one user being either a first reputation of normally having malicious software on a computing system of the user or a second reputation of not normally having malicious software on a computing system of the user;
      determining whether the software publisher of the unknown application has a reputation, the reputation of the software publisher at least including aggregated user reputations of users of software published by the software publisher including the previously determined reputations of the at least one user of software published by the software publisher; and
      assigning said reputation of the software publisher to said unknown application upon a determination that said software publisher does have the reputation,
         wherein the reputation of the software publisher includes a number of applications including malware published by the software publisher, and
         the assigning of the reputation changes the unknown application to a known application.

16. A computer-program product comprising a non-transitory tangible computer readable storage medium containing computer program code comprising:
   a software publisher trust extension application for:
      determining a software publisher of an unknown application, wherein the unknown application is an application without an assigned reputation;
      determining reputations of respective ones of at least one user of software published by the software publisher, wherein individual respective reputations of ones of the at least one user being either a first reputation of normally having malicious software on a computing system of the user or a second reputation of not normally having malicious software on a computing system of the user;
      determining whether the software publisher of the unknown application has a reputation, the reputation of the software publisher at least including aggregated user reputations of users of software published by the software publisher including the previously determined reputations of the at least one user of software published by the software publisher; and
      assigning said reputation of the software publisher to said unknown application upon a determination that said software publisher does have the reputation,
         wherein the reputation of the software publisher includes a number of applications including malware published by the software publisher, and
         the assigning of the reputation changes the unknown application to a known application.

* * * * *